United States Patent [19]

Enwiller

[11] Patent Number: 4,930,244
[45] Date of Patent: Jun. 5, 1990

[54] APPARATUS FOR RETRIEVING LODGED FISHING LURES

[76] Inventor: Vernon L. Enwiller, 791 N. Comanche Dr., Chandler, Ariz. 85224

[21] Appl. No.: 451,868

[22] Filed: Dec. 18, 1989

[51] Int. Cl.$^5$ ............................................. A01K 97/00
[52] U.S. Cl. .................................................... 43/17.2
[58] Field of Search .................... 43/17.2, 44.9, 43.14

[56] References Cited

U.S. PATENT DOCUMENTS

| | | | |
|---|---|---|---|
| D. 192,688 | 5/1962 | Watts | D31/4 |
| 720,136 | 2/1903 | Halliran | |
| 2,316,500 | 4/1943 | Bray | 43/30 |
| 2,479,448 | 8/1949 | Woock | 43/30 |
| 2,493,100 | 1/1950 | Adams | 43/17.2 |
| 2,562,413 | 7/1951 | Carr | 43/17.2 |
| 2,732,650 | 1/1956 | Passmore et al. | 43/17.2 |
| 2,765,567 | 10/1956 | Fifer | 43/17.2 |
| 2,770,062 | 11/1956 | Russell | 43/17.2 |
| 2,807,905 | 10/1957 | Ford | 43/17.2 |
| 2,826,849 | 3/1958 | Frederick | 43/17.2 |
| 2,940,203 | 6/1960 | Carter | 43/17.2 |
| 3,531,887 | 10/1970 | Bortle | 43/17.2 |
| 4,286,402 | 9/1981 | Kuhn et al. | 43/17.2 |

*Primary Examiner*—M. Jordan
*Attorney, Agent, or Firm*—Don J. Flickinger; Jordan M. Meschkow; Lowell W. Gresham

[57] ABSTRACT

A fishing lure retriever is disclosed which is of the of the class including a generally cylindrical weighted main body and eye guides adapted to slidably couple the retriever to a fishing line, thus permitting it to slide down the fishing line to the site of a lodged lure. Lure engagement structure is provided integral with the retriever and is generally bulbous, being composed of a series of equatorially distributed filament loops. A cord fixed to the upper end of the retriever permits tugging on it after engagement has been made with a lodged lure to dislodge and retrieve the lure. The bulbous engagement structure is preferably formed by feeding the filament out a first one of a plurality of circumferentially equally distributed apertures provided in a lower cap member of the retriever and back in the diametrically opposite aperture, then back out an aperture adjacent the first aperture, the process thereafter continuing from position to position to obtain the equatorially distributed loops effecting the ball-like structure.

3 Claims, 2 Drawing Sheets

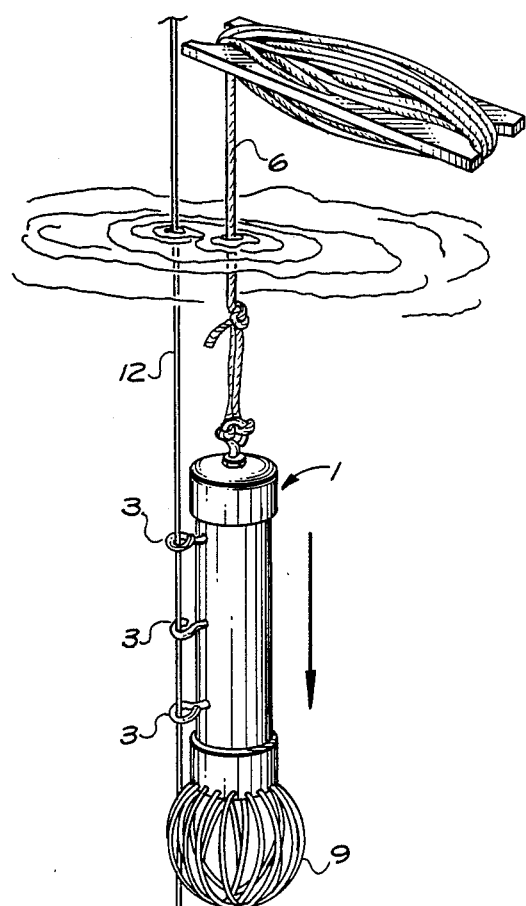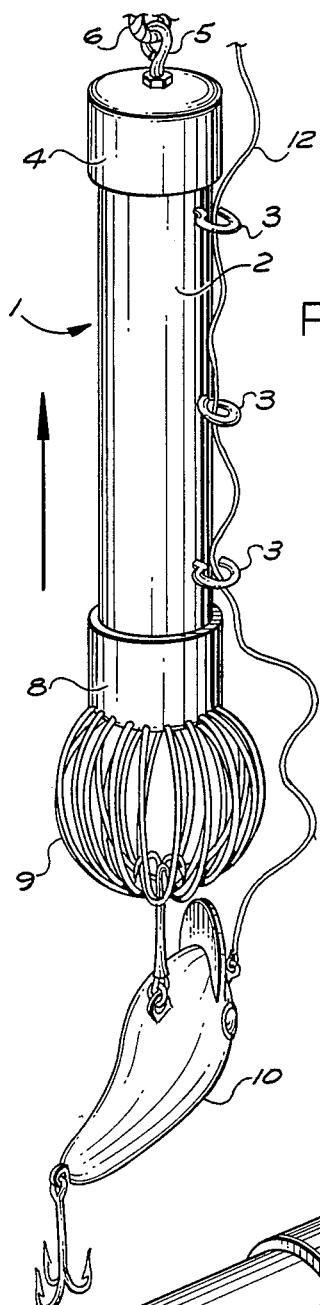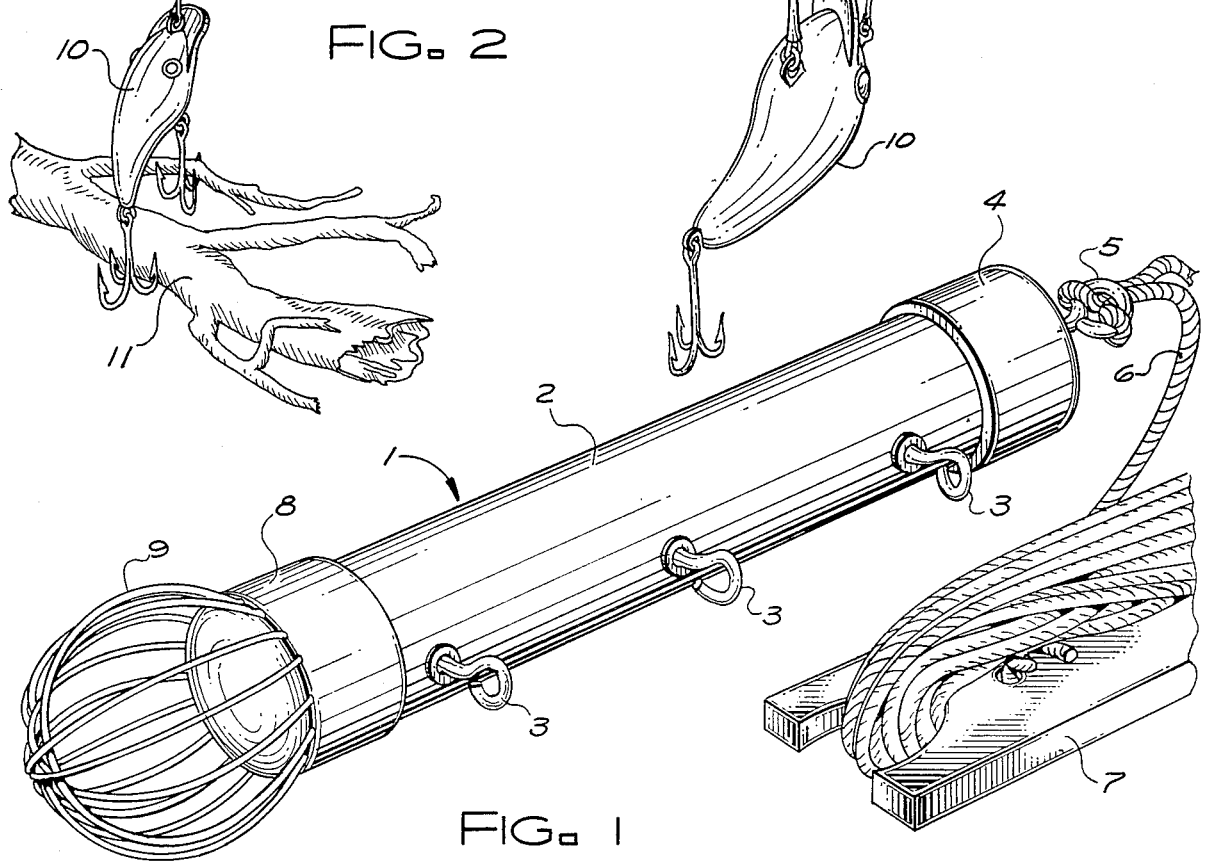

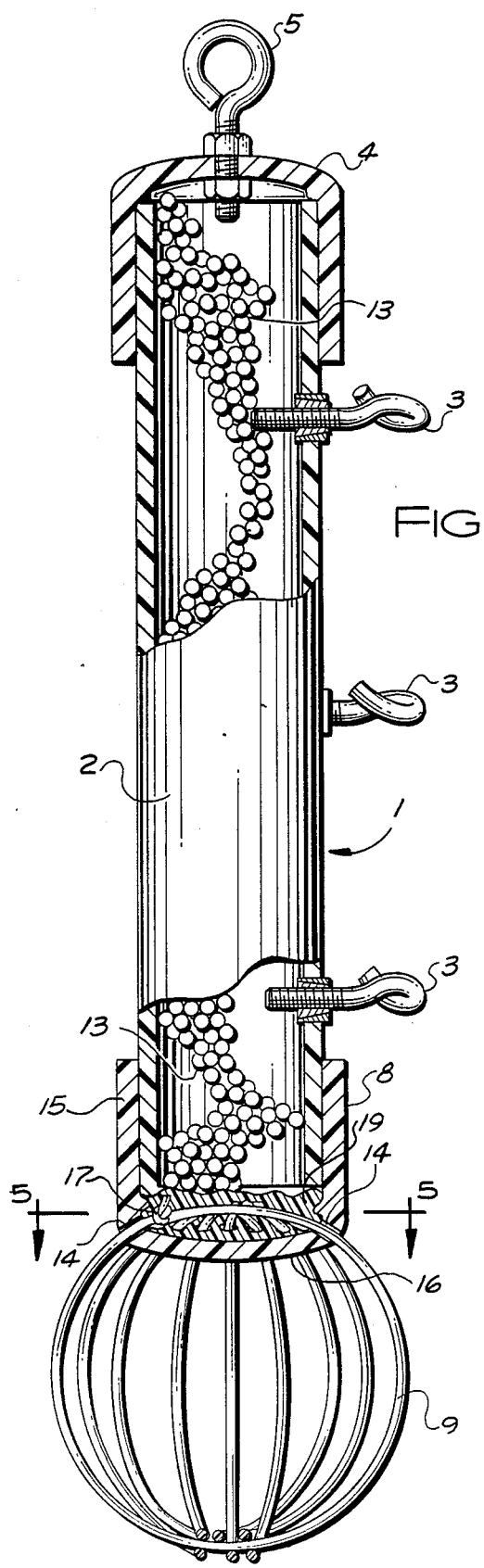
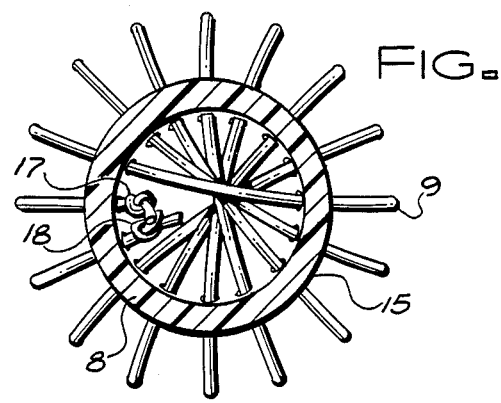
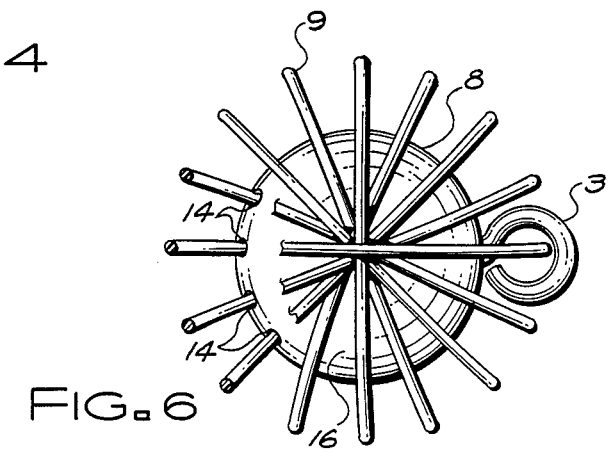
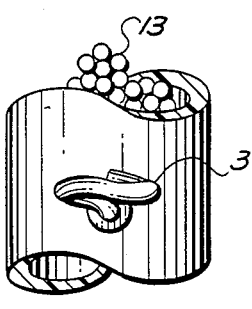

APPARATUS FOR RETRIEVING LODGED FISHING LURES

FIELD OF THE INVENTION

This invention relates to the art of fishing and, more particularly, to apparatus for retrieving fishing lures which have become lodged with an obstacle beneath the surface of the water.

BACKGROUND OF THE INVENTION

Those skilled, or even not particularly skilled, in the art of angling are only too familiar with the ubiquitous problem of the snagged or otherwise lodged fishing lure. A lodged lure is an aggravation for various reasons: the lure may be relatively expensive, it may be a favorite of the angler or the mere fact of the lure becoming lodged may be annoying. In any event, the angler will typically undertake to retrieve a lodged lure by manipulating his rod and line, but such efforts often result in utter defeat and the abandonment of the coveted lure. Therefore, anglers have sought to provide apparatus especially adapted to dislodge and retrieve lodged lures. Among such prior art lure retrieval apparatus are those disclosed in U.S. Letters Pats.: 720,136 to Halliran; 2,316,500 to Bray; 2,479,448 to Woock; 2,562,413 to Carr; 2,765,567 to Fifer; 2,770,062 to Russell; 2,826,849 to Frederick; 3,531,887 to Bortle; and D192,688 to Watts. These lure retrievers, and the subject invention, all belong to the class in which the weighted retriever is slidably coupled to the fishing line which guides it downwardly to the site of the lodged lure. In each case, a special component serves to engage the lure such that a separate, strong cord secured to the retrieval apparatus may be tugged on to hopefully dislodge the lure if it has not been dislodged by the impact of the retriever. Those skilled in the art will appreciate that it is the secure engagement of the retrieval apparatus with the lodged lure that is the key to the success of the retrieval process, and it is to this ongoing area of weakness experienced with the prior art lure retrievers that the present invention is directed.

OBJECTS OF THE INVENTION

It is therefore a broad object of this invention to provide an improved fishing lure retrieval apparatus.

It is a more specific object of this invention to provide a fishing lure retriever which incorporates improved structure for effectively engaging the retriever with a lodged lure.

It is a still more specific object of this invention to provide such a fishing lure retriever which incorporates a bottom situated, generally bulbous structure made up of a series of equatorially distributed loops of filament to effect the engaging function

SUMMARY OF THE INVENTION

Briefly, these and other objects of the invention are achieved by a lure retriever of the class including a generally cylindrical weighted main body having eye guides adapted to slidably couple the retriever to a fishing line, thus permitting it to slide down the fishing line to the site of a lodged lure. Lure engagement structure is provided integral with the retriever, and a particular feature of the subject lure retriever is that the engagement structure is a generally bulbous structure composed of a series of equatorially distributed filament loops. A cord fixed to the upper end of the retriever permits tugging on it after engagement has been made with a lodged lure to dislodge and retrieve the lure. The bulbous engagement structure is preferably formed by feeding the filament out a first one of a plurality of circumferentially equally distributed apertures provided in a lower cap member of the retriever and back in the diametrically opposite aperture, then back out an aperture adjacent the first aperture, the process thereafter continuing from position to position to obtain equatorially distributed loops effecting the ball-like structure which very effectively achieves the engaging function.

DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

FIG. 1 is an pictorial view of the subject fishing lure retriever in an inactive state awaiting use;

FIG. 2 is a pictorial view of the subject fishing lure retriever in use as it descends toward a lodged lure;

FIG. 3 illustrates a second stage of the use of the retriever after the lodged lure has been engaged and dislodged;

FIG. 4 is a partially broken away view showing certain of the interior structure of the retriever;

FIG. 5 is a cross section view taken along the lines 5—5 of FIG. 4;

FIG. 6 is a bottom view of the retriever; and

FIG. 7 is a partial side view of the retriever particularly illustrating one of a series of vertically distributed guide components thereof.

DETAILED DESCRIPTION OF THE INVENTION

Referring now to FIG. 1, it will be seen that the subject fishing lure retriever 1 includes a cylindrical main body 2 which, as will be explained more fully below, is heavily weighted. Extending radially outwardly from the main body 2 are a series of longitudinally aligned eye guides 3. At the upper end of the main body 2, there is provided an upper cap 4 from which there extends an axially extending eyelet 5 to which an accessory retrieval cord 6 may be attached. The cord 6 may be wound onto a bobbin 7 for convenience when the retriever is stored, the bobbin 7 facilitating payout of the cord in use as will be explained below.

At the lower end of the main body 2, there is provided a lower cap which supports a downwardly extending, generally bulbous structure 9 made up of a series of equatorially distributed loops of filament (such as heavy mono-filament nylon) to effect the engaging mechanism for coupling the retriever with the lodged lure. This lure-engaging structure is a principal feature of the invention as will become more apparent as the description proceeds.

Thus, attention is now directed to FIG. 2 which illustrates a lure 10 lodged in an obstruction 11 as a typical example of a situation in which the subject retriever may be used to advantage. The lure 10 is connected to a fishing line 12 which is, in turn, coupled to a rod and reel (not shown) in the conventional manner. As shown, the retriever 1, having been attached to the fishing line 12 by the angler's having weaved the line into the eye guides 3, is descending (aided by its substantial weight) along the line toward the lodged lure 10.

Referring also the FIG. 3, when the lure 10 is reached, the retrieval cord 6 may be jigged until the loops of the bulbous lure-engaging structure 9 become entangled with the lure. Then, as best shown in FIG. 3, the lure can be pulled up using the retriever cord 6 to free the lure and bring it to the surface. If especially forcible operation is appropriate, the bobbin 7 can be used as a handle to facilitate strong pulling action. The generally bulbous configuration of the equatorially spaced loops of the ball-engaging structure 9 is extremely effective in insuring a secure coupling to the lure 10 in order that strong tugs on the retrieval cord 6 may be employed to free the lure from even very difficult snagged conditions.

Attention is now directed to FIGS. 4, 5, 6 and 7 which show more details of the structural arrangement of the subject lure retriever. In FIG. 4, it will be seen that the main body 2 is hollow with the ends being closed off by an upper cap 4 and a lower cap 8, respectively. The interior of the main body 2 is filled with a heavy ballast material, such as lead shot 13, in order to obtain the necessary weight to ensure a rapid descent in operation.

Referring particularly to FIGS. 4 and 6, the lower cap 8 is provided with a series of circumferentially equally distributed apertures 14 directed angularly outwardly and downwardly in the region of the junction between the cylindrical portion 15 and the end portion 16 of the lower cap. Now referring also to FIG. 5, it will be understood that the bulbous array of loops 9 may be readily formed by threading the filament from the interior of the cap through a first one of the apertures 14, making a loop and feeding the filament back through the aperture 14 diametrically opposite the first aperture. Then, the filament is fed back to and out through the aperture adjacent the first aperture, the process then continuing from position to position to obtain the equatorially distributed loops effecting the ball-like structure which achieves the engaging function. Knots 17 and 18 provided in the ends of the filament serve to secure the thus formed engaging structure in place. The engaging structure may be further secured and stabilized by a potting material 19, such as glue or resin, poured as a liquid into lower cap 8 and allowed to set or solidify around the filament segments therewith.

As has been previously stated, the equatorially distributed loops of the engaging structure serve to very reliably achieve a strong coupling to a lodged lure which may then be retrieved as discussed above.

Thus, while the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

What is claimed is:

1. In a fishing lure retriever of the class including:
   (A) a generally cylindrical weighted main body having an upper end and a lower end;
   (B) guide means adapted to slidably couple said lure retriever to a fishing line;
   (C) engagement means integral with said retriever and adapted to engage a lodged lure accessed by coupling said lure retriever to a fishing line and permitting it to slide down the fishing line to the site of the lodged lure; and
   (D) a cord fixed to the upper end of said main body to permit tugging said lure retriever after engagement has been made with a lodged lure to dislodge and retrieve it;
   the improvement in which:
   (E) said engagement means comprises a generally bulbous structure situated at said lower end of said main body, said generally bulbous structure being composed of a series of equatorially distributed loops of filament.

2. The fishing lure retriever of claim 1 in which:
   (A) said main body is hollow, is capped off at said upper and lower ends, respectively, with upper and lower cap members and is substantially filled with a heavy ballast material;
   and in which:
   (B) said lower cap is provided with a plurality of circumferentially equally distributed apertures; and
   (C) said generally bulbous structure effecting said engagement means is formed by threading said filament out from the interior of said lower cap through a first one of said apertures and back into the one of said apertures diametrically opposite said first aperture, then out an aperture adjacent said first aperture, the process thereafter continuing from position to position to obtain the equatorially distributed loops effecting the ball-like structure which achieves the engaging function.

3. The fishing lure retreiver of claim 2, further including a potting material contained within said lower cap for securing the portions of said filament within the interior thereof.

* * * * *